United States Patent [19]

Röck et al.

[11] Patent Number: 4,804,239
[45] Date of Patent: Feb. 14, 1989

[54] RAIL FITTING ASSEMBLY FOR USE IN A DRAWER

[75] Inventors: Erich Röck; Josef Brunner, both of Höchst; Helmut Hollenstein, Lustenau, all of Austria

[73] Assignee: Julius Blum Gesellschaft M.B.H., Höchst, Austria

[21] Appl. No.: 46,174

[22] Filed: May 5, 1987

[30] Foreign Application Priority Data

May 14, 1986 [AT] Austria .................. 1280/86

[51] Int. Cl.⁴ .................................. A47B 48/00
[52] U.S. Cl. .......................... 312/265; 312/330 R; 403/353; 403/348; 403/349
[58] Field of Search ............ 312/257 R, 257 SK, 263, 312/264, 265, 183, 184, 330 R; 403/348, 349, 353, 361, 378, 379, 362, 326

[56] References Cited

U.S. PATENT DOCUMENTS

| | | | |
|---|---|---|---|
| 1,139,189 | 5/1915 | Kimball | 403/326 |
| 1,970,836 | 7/1930 | Boote | 312/330 |
| 2,325,317 | 7/1943 | Hanna | 312/330 X |
| 3,400,417 | 9/1968 | Moret | 403/326 X |
| 4,009,507 | 3/1977 | Lascarrou | 403/353 X |
| 4,043,685 | 8/1977 | Hyams | 403/326 |
| 4,163,618 | 8/1979 | Giovannetti | 403/353 X |
| 4,219,247 | 8/1980 | Litchfield et al. | 312/330 R X |
| 4,563,040 | 1/1986 | Alster | 312/265 |
| 4,597,499 | 7/1986 | Hanula | 403/379 |

FOREIGN PATENT DOCUMENTS

| | | | |
|---|---|---|---|
| 847757 | 7/1970 | Canada | 312/265 |
| 2131286 | 6/1984 | United Kingdom | 312/330 R |

Primary Examiner—Joseph Falk
Attorney, Agent, or Firm—Wenderoth, Lind & Ponack

[57] ABSTRACT

A fitting for a drawer, which can be assembled from a plurality of components and has metal drawer side walls which at the same time form pull-out rails for extracting the drawer includes a fastener for connecting each rail to a front panel (3) and a rear wall (3) of the drawer. Each drawer side wall is provided with a fastening plate (3) for the rear wall (3) of the drawer. Attachments connect opposite ends of the rail to the front panel and the rear wall of the drawer. Rail has at one end thereof an adaptor and at the other end thereof an annular groove.

13 Claims, 4 Drawing Sheets

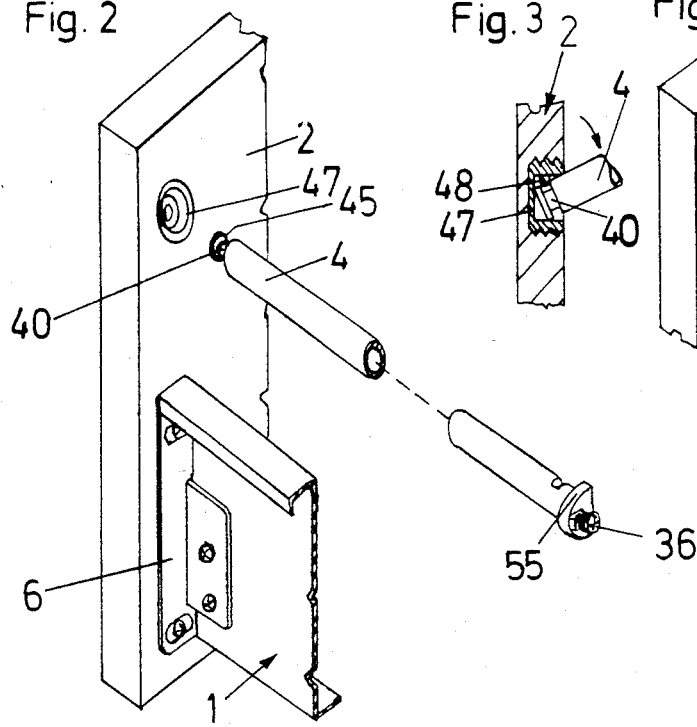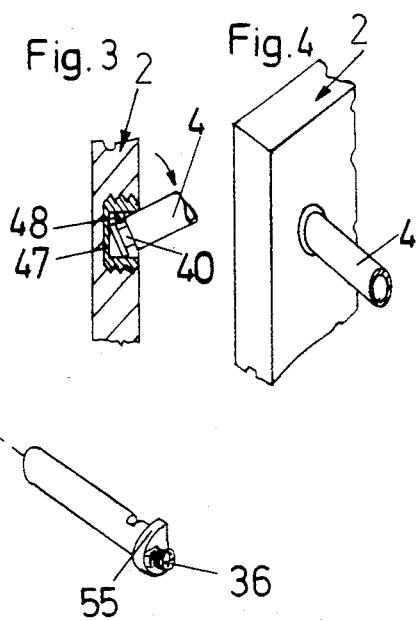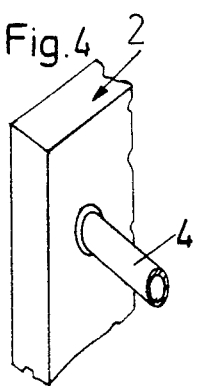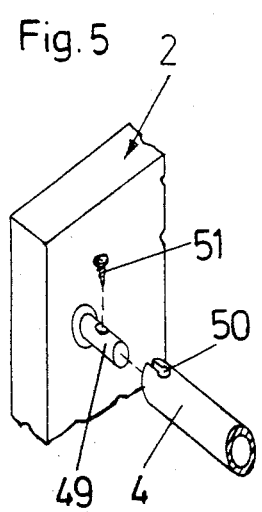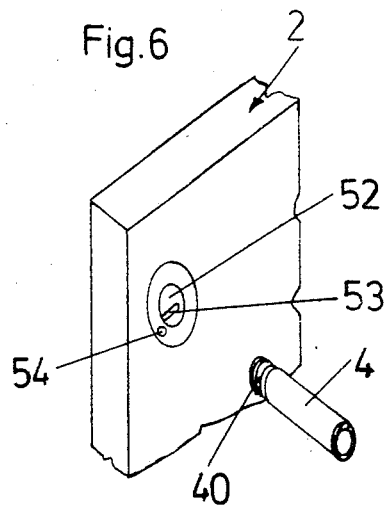

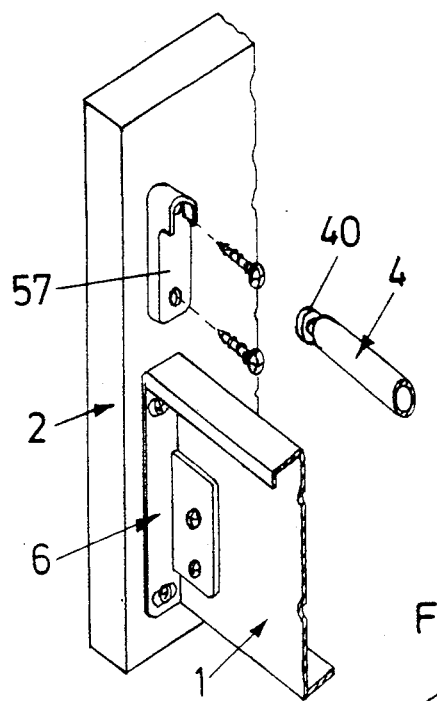
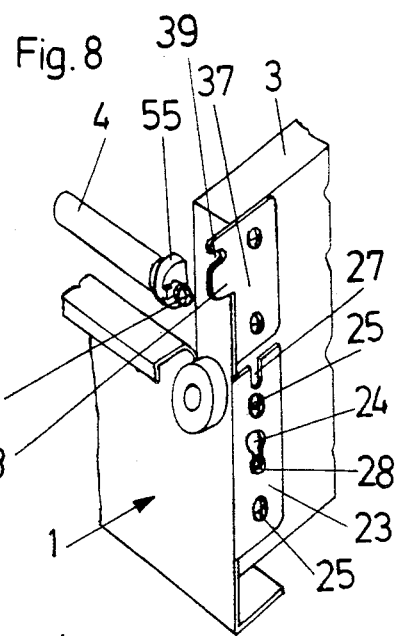
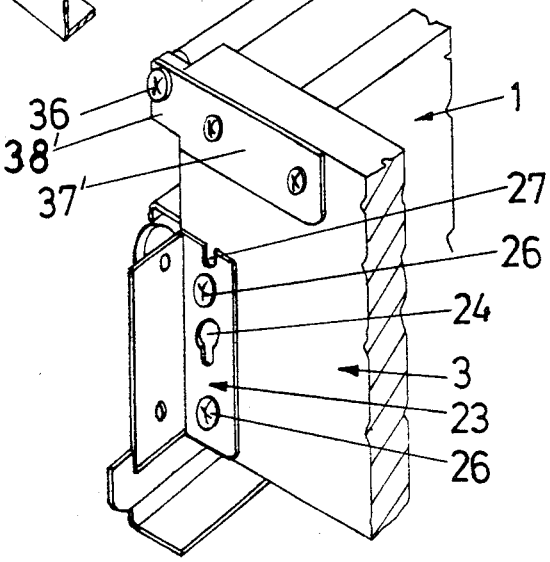
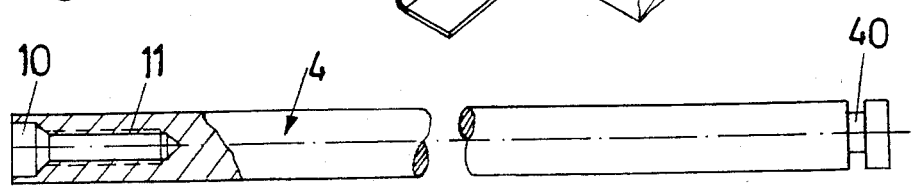

RAIL FITTING ASSEMBLY FOR USE IN A DRAWER

BACKGROUND OF THE INVENTION

The invention relates to a fitting for a drawer which can be assembled from a plurality of components and has metal drawer side walls which at the same time form pull-out rails for extracting the drawer and which include fastening means for a front panel and a rear wall of the drawer, each drawer side wall having a fastening plate for the rear wall of the drawer, and holding means for a rail being provided on the front panel and on the rear wall of the drawer.

In addition to those drawers which are produced in one piece, in particular drawers of plastics material, drawers still predominantly used are those which are assembled from a plurality of components.

These drawers are generally provided with fittings which are part of the pull-out guide mounting and which facilitate the extraction and insertion, respectively, of the drawer from and into an article of furniture respectively.

In addition, modern drawers of this type comprise a front plate holding means which makes it possible to adjust the position of the front panel, in order to correct the alignment of the drawer relative to joints and the front plane of the article of furniture after the drawer has been inserted into the latter.

SUMMARY OF THE INVENTION

The object of the invention is to provide fittings for a drawer which can be assembled from a plurality of components and which permit a simple assembly of rails of the drawer.

This object is attained according to the invention in that the rail comprises at one end an adaptor and at the other end an annular groove.

In the case of a fitting which includes a fastening plate for the rear wall of the drawer, such plates include lugs that project laterally beyond the rear wall of the drawer and in which the rails can be hung.

In addition, it is advantageously provided that the holding means for each side of the front panel includes a casing similar to a tenon socket, in which a leg spring or the like is disposed to extent in a radial plane and which engages in an annular groove in the rail.

A further embodiment includes a holding member which can be screwed onto each side of the front panel and which has a curved cap in the form of a semicircle and including a web which engages in the annular groove in the rail, the cap being arranged opposite a resilient tongue to support the rail.

BRIEF DESCRIPTION OF THE DRAWINGS

Various embodiments of the invention are described below with reference to the accompanying drawings, in which:

FIGS. 2 and 4–7 are perspective views of various arrangements for fastening a rail to a front panel of the drawer;

FIG. 3 is a section of the arrangement of FIG. 2;

FIGS. 8 and 9 are perspective views of arrangements of members for fastening the rail to rear wall of the drawer;

FIG. 10 is a lateral view, partially in section, of a drawer rail;

DETAILED DESCRIPTION OF THE INVENTION

Figure 1:
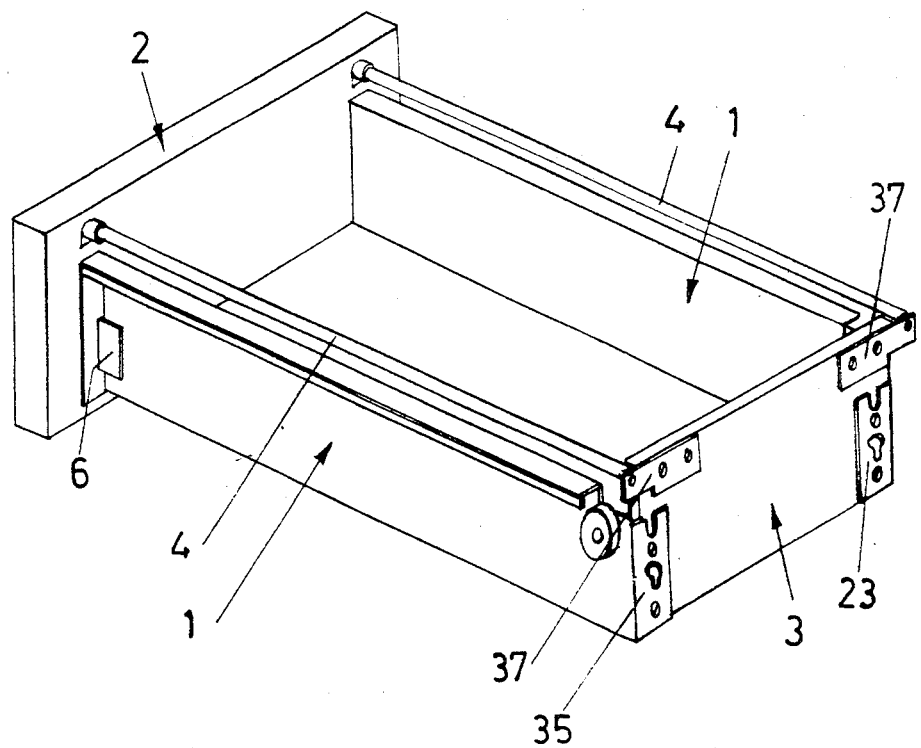
FIG. 1 is a perspective view of a drawer incorporating the invention.

The essential parts of the drawer the two drawer side walls 1, a front panel 2, a rear wall 3 of and a rail 4 on each side.

The front panel 2 is secured to each drawer side wall 1 by means of a holding apparatus 6.

Each drawer side wall 1 is provided at the rear with a fastening plate 23 extending at a right angle to the drawer side wall 1 and provided with a keyhole 24 and two fastening holes 25 for screws 26. The upper edge of the fastening plate 23 has therein an open slot 27. Each side of the rear wall 3 of the drawer carries a fastening bolt 28 for insertion into the respective keyhole 24, whereby the rear wall 3 is supported. The rear wall 3 of the drawer can then be securely joined to the drawer walls 1 either by simply tightening the fastening bolts 28 or by additionally screwing in the screws 26.

In the embodiment according to FIGS. 2 to 4, each side of the front panel 2 has therein attachment means in the form of a casing 47 similar to a tenon socket which is provided on the inside with retainer means in the form of a projecting web or pin 48. Each rail 4, which is provided with an outer annular groove 40, can, as shown in FIG. 3, be inserted or hung in the respective casing 47, so that the web or pin 48 engages in the annular groove 40 and holds the rail 4.

In the embodiment according to FIG. 5 a holding pin 49 is inserted in each side of the front panel 2. The rail 4' is constructed as a tube and is provided at the front with a hole 50. The front end of the tube forms the receiving socket. The hole 50 is advantageously a keyhole. The receiving socket of the rail 4 is fitted over the pin 49 and a screw 51 which projects through the hole 50 and is screwed onto pin 49.

In the embodiment according to FIG. 6, an attachment means in the form of a casing 52 similar to a tenon socket has therein a retainer means in the form of a spring 53 and is inserted into a respective side of front panel 2. The spring 53 can be a leaf or coil spring and projects into the annular groove 40 of the rail 4 and thus holds the rail.

A hole 54 is formed on the side of the casing 52. When the rail 4 is to be extracted from the casing 52, the spring 53 can be raised and removed from the annular groove 40 by a screwdriver which is inserted through the hole 54.

Figure 14:
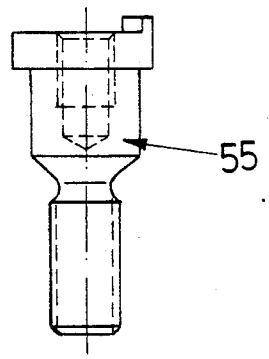
FIG. 14 is a side view of an adaptor.

The rear end of each rail 4 is preferably provided with an adaptor 55 (FIGS. 8 and 14) which is screwed into a female thread 11 in a receiving socket 10 in the rail. The adaptor 55 can be hung, by means of a screw 36 threaded into thread 11, on the holding plate 37 (FIG. 8) or 37' (FIG. 9) and can be secured thereto. The angular position of the front panel 2 can be set by rotating the rail 4.

Figure 11:
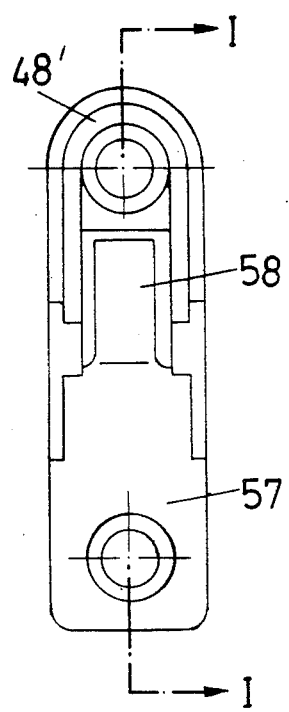
FIGS. 11 and 13 are front and rear elevations, respectively, of a member for fastening the rail to the front panel.
Figure 12:
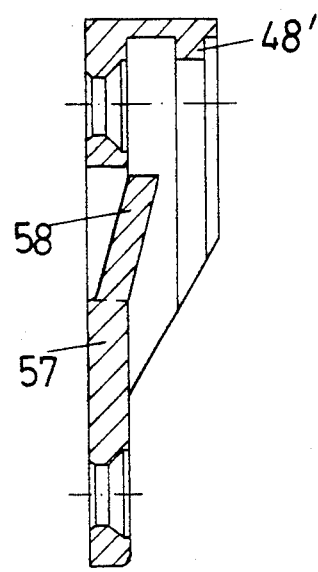
FIG. 12 is a section along line I—I of FIG. 11.
Figure 13:
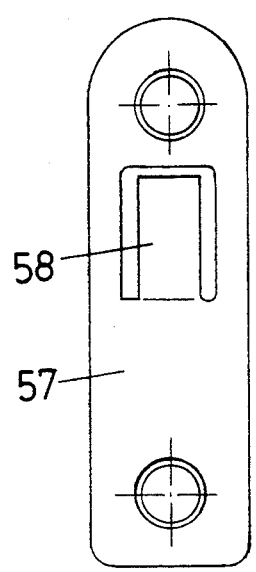

In the embodiment of FIGS. 11–13, an attachment means in the form of a holding member 57 is attached by screws to each side of the front panel 2. Holding member 57 has therein a retainer means in the form of a web 48' which engages in the annular groove 40 of the rail 4 when the latter is inserted therein.

Below the rail 4 the holding member 57 is provided with a resilient lug 58 which normally prevents the rail 4 from falling down. If the rail 4 is to be released from the front panel 2, it is sufficient for the resilient lug 58 to be pressed towards the front panel 2, after which the rail 4 can be removed downwardly from the front panel 2.

The holding plates 37 or 37' on the rear wall 3 comprise lugs 38 or 38' projecting laterally beyond the rear wall 3 and each having a slot 39 in which the rail 4 can be hung.

We claim:

1. A rail fitting assembly for use in a drawer including opposite side walls, a rear wall and a front panel, said assembly comprising:

a longitudinal rail to be mounted above a drawer side wall and to be connected at a rear end to a drawer rear wall and at a front end to a drawer front panel, said front end of said rail having formed therein an inwardly extending annular groove, and said rear end of said rail having formed therein an axially extending internal socket;

front attachment means, to be mounted on the drawer front panel, for supporting said front end of said rail, said front attachment means comprising a casing having a hollow interior receiving said front end of said rail and retainer means within said hollow interior and fitting into said annular groove for retaining said front end of said rail; and rear attachment means, to be connected to the drawer rear wall, for extending into and supporting said socket of said rear end of said rail.

2. An assembly as claimed in claim 1, wherein said retainer means comprises a pin or web projecting from said casing to fit into said annular groove.

3. An assembly as claimed in claim 1, wherein said retainer means comprises a spring member projecting from said casing to fit into said annular groove.

4. An assembly as claimed in claim 1, wherein said socket in said rear end of said rail is internally threaded, and said rear attachment means comprises an adaptor including an externally threaded portion to threadingly engage with said internally threaded socket.

5. An assembly as claimed in claim 4, further comprising a plate to be mounted on the drawer rear wall and having a lug to project laterally of the drawer rear wall, and means for connecting said adaptor to said lug.

6. An assembly as claimed in claim 5, wherein said connecting means comprises a screw extending through said lug into said adaptor.

7. An assembly as claimed in claim 6, wherein said screw extends through an open-ended slot in said lug.

8. A rail fitting assembly for use in a drawer including opposite side walls, a rear wall and a front panel, said assembly comprising:

a longitudinal rail to be mounted above a drawer side wall and to be connected at a rear end to a drawer rear wall and at a front end to a drawer front panel, said front end of said rail having formed therein an inwardly extending annular groove, and said rear end of said rail having formed therein an axially extending internal socket;

front attachment means, to be mounted on the drawer front panel, for supporting said front end of said rail, said front attachment means comprising a holding member having a top portion positioned over said front end of said rail and a lower flexible portion positioned beneath said front end of said rail, and retainer means comprising a web projecting from said top portion and fitting into said annular groove for retaining said front end of said rail; and rear attachment means, to be connected to the drawer rear wall, for extending into and supporting said socket of said rear end of said rail.

9. An assembly as claimed in claim 8, wherein said flexible lower portion comprises a resilient tongue extending from said holder member to support said front end of said rail and deflectable to allow said front end of said rail to be attached to and removed from said holding member.

10. An assembly as claimed in claim 8, wherein said socket in said rear end of said rail is internally threaded, and said rear attachment means comprises an adaptor including an externally threaded portion to threadingly engage with said internally threaded socket.

11. An assembly as claimed in claim 10, further comprising a plate to be mounted on the drawer rear wall and having a lug to project laterally of the drawer rear wall, and means for connecting said adaptor to said lug.

12. An assembly as claimed in claim 11, wherein said connecting means comprises a screw extending through said lug into said adaptor.

13. An assembly as claimed in claim 12, wherein said screw extends through an open-ended slot in said lug.

* * * * *